(12) United States Patent
Hicks et al.

(10) Patent No.: US 7,761,370 B1
(45) Date of Patent: Jul. 20, 2010

(54) METHOD AND SYSTEM FOR GENERATING AND PROCESSING AN ELECTRONIC PAYROLL VOUCHER

(75) Inventors: Terry Hicks, Mountain View, CA (US); Paul J. Rosenfeld, Mountain View, CA (US)

(73) Assignee: Intuit Inc., Mountain View, CA (US)

(*) Notice: Subject to any disclaimer, the term of this patent is extended or adjusted under 35 U.S.C. 154(b) by 106 days.

(21) Appl. No.: 11/592,360

(22) Filed: Nov. 3, 2006

(51) Int. Cl.
 *G06Q 40/00* (2006.01)
(52) U.S. Cl. ...................................... 705/38
(58) Field of Classification Search ............... 705/35–42
 See application file for complete search history.

(56) References Cited

U.S. PATENT DOCUMENTS

| | | | |
|---|---|---|---|
| 5,953,709 A * | 9/1999 | Gilbert et al. | 705/35 |
| 6,401,079 B1 * | 6/2002 | Kahn et al. | 705/30 |
| 6,411,938 B1 * | 6/2002 | Gates et al. | 705/30 |
| 6,764,013 B2 * | 7/2004 | Ben-Aissa | 235/472.01 |
| 6,829,588 B1 * | 12/2004 | Stoutenburg et al. | 705/30 |
| 7,636,665 B2 * | 12/2009 | Cooperstone et al. | 705/1.1 |
| 2001/0034676 A1 * | 10/2001 | Vasic | 705/30 |
| 2003/0014363 A1 * | 1/2003 | Sethi | 705/44 |
| 2003/0074311 A1 * | 4/2003 | Saylors et al. | 705/39 |
| 2003/0236746 A1 * | 12/2003 | Turner et al. | 705/40 |
| 2004/0049436 A1 * | 3/2004 | Brand et al. | 705/30 |
| 2004/0111361 A1 * | 6/2004 | Griffiths et al. | 705/39 |

OTHER PUBLICATIONS

"ADP EasyPay Makes Payroll Efficient for Small Businesses," T. Allen Rose, CPA, NPA magazine, Apr./May 2006 p. 1.*
"Criteria on Report Screen Adds to Efficient Processing", Ellen DePasquale, NPA, Apr./May 2006.*
Richard McCausland. "HR software angles for a promotion", Accounting Technology. Boston: Jan./Feb. 2003. vol. 19, Iss 1; p. 40, 6 pgs.*
Ellen DePasquale. "Criteria on Report Screen Adds to Efficient Processing". NPA magazine. Apr./May 2006. p. 1.*
Barry Knaster. "The Return of Payroll". Accounting Technology. Boston: Apr. 2006. vol. 22, Iss 3; p. 27, 4 pgs.*
T. Allen Rose, CPA. "ADP EasyPay Makes Payroll Efficient for Small Businesses". NPA magazine. Apr./May 2006. p. 1.*

* cited by examiner

*Primary Examiner*—James P Trammell
*Assistant Examiner*—Mohammad Z Shaikh
(74) *Attorney, Agent, or Firm*—Osha • Liang LLP (57) ABSTRACT

A method of distributing pay includes obtaining payroll information associated with a payee, generating an electronic paycheck voucher based on the payroll information, wherein the electronic paycheck voucher is associated with a net pay of the payee, issuing the electronic paycheck voucher to the payee, and processing the electronic paycheck voucher to distribute the net pay based on a distribution preference defined by the payee.

29 Claims, 8 Drawing Sheets

PAYEE PROFILE
ELECTRONIC PAYCHECK VOUCHER DISTRIBUTION PREFERENCE PAGE

Welcome, John Doe:
- The current percentage distribution of your electronic paycheck voucher is shown
- If desired, please modify the percentage amount indicated to edit/update the electronic paycheck voucher distribution

| Payment Destination Name | Percentage of electronic paycheck voucher |
|---|---|
| Bank A Checking Account ending in *********5678 by EFT | 50% |
| Bank B Savings Account ending in *********3748 by wire | 15% |
| Hard copy check to Aunt Jenney via regular mail | 5% |
| Pay card account number ending in *********1234 by courier | 30% |
| TOTAL | 100% |

METHOD AND SYSTEM FOR GENERATING AND PROCESSING AN ELECTRONIC PAYROLL VOUCHER

BACKGROUND

Compensation is something given or received as an equivalent for services, debt, loss, injury, suffering, goods, etc. Compensation is usually provided in the form of money. Alternatively, compensation may be given as a product or service in return for the product or service provided, such as stock options, insurance policy, and/or other compensatory items.

For example, if an individual is employed by a company on a full-time basis, the individual may be compensated for his services to the company through a salary package. A salary package for an employee typically includes a gross pay amount that is paid by the employer to the employee on a set periodic basis. The salary package may also include individual and/or group benefits, such as retirement savings, health care, childcare reimbursement, life insurance, parking, paid vacation, tuition reimbursement, and/or other benefits.

In turn, when the employee receives payment, he uses the compensation to pay for products and services received. For example, an individual makes payments on a daily basis for a variety of products and services like, food, apartment rent, gasoline, telephone bills, prescription medicine, health services, and/or other items. Similarly, a company may make payments to other companies on a periodic or on an as needed basis for products or services. Such payments may be performed by providing the appropriate recipient with hard currency, personal or company check, debit note, money order, and/or other forms of payment. Such payment may also be performed electronically. For example, payment may be performed by an electronic funds transfer (or direct deposit), using a debit or a credit card, and/or other methods of payment. The recipient of the funds may then access the appropriate financial account to gain access of the payment received.

SUMMARY

In general, in one aspect, the invention relates to a method of distributing pay, comprising obtaining payroll information associated with a payee, generating an electronic paycheck voucher based on the payroll information, wherein the electronic paycheck voucher is associated with a net pay of the payee, issuing the electronic paycheck voucher to the payee, and processing the electronic paycheck voucher to distribute the net pay based on a distribution preference defined by the payee.

In general, in one aspect, the invention relates to a method of processing a payment, comprising accessing an electronic paycheck voucher by a payee, wherein the electronic paycheck voucher is associated with a net pay of the payee, selecting a distribution preference for the net pay, and processing the electronic paycheck voucher to distribute the net pay based on the distribution preference defined by the payee.

In general, in one aspect, the invention relates to a system for processing a payment comprising a payroll data repository configured to store payroll data, a paycheck voucher generator configured to generate an electronic paycheck voucher for a payee and store the electronic paycheck voucher in the payroll data repository, wherein the electronic paycheck voucher is associated with a net pay of the payee, a payee interface configured to access the electronic paycheck voucher via the payroll data repository, and an electronic paycheck voucher processing unit configured to process the electronic paycheck voucher to distribute the net pay based on a distribution preference defined by the payee.

In general, in one aspect, the invention relates to a computer readable medium comprising software instructions stored therein for processing a payment, wherein the software instructions perform obtaining payroll information associated with a payee, generating an electronic paycheck voucher based on the payroll information, wherein the electronic paycheck voucher is associated with a net pay of the payee, issuing the electronic paycheck voucher to the payee, and processing the electronic paycheck voucher to distribute the net pay based on a distribution preference defined by the payee.

In general, in one aspect, the invention relates to a computer readable medium comprising software instructions stored therein for processing a payment, wherein the software instructions perform accessing an electronic paycheck voucher by a payee, wherein the electronic paycheck voucher is associated with a net pay of the payee, selecting a distribution preference for the net pay, and processing the electronic paycheck voucher to distribute the net pay based on the distribution preference defined by the payee.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to generate and process an electronic paycheck voucher. Specifically, embodiments of the invention provide a method and system to generate and process an electronic paycheck voucher based on a distribution preference defined by a payee.

Figure 1:
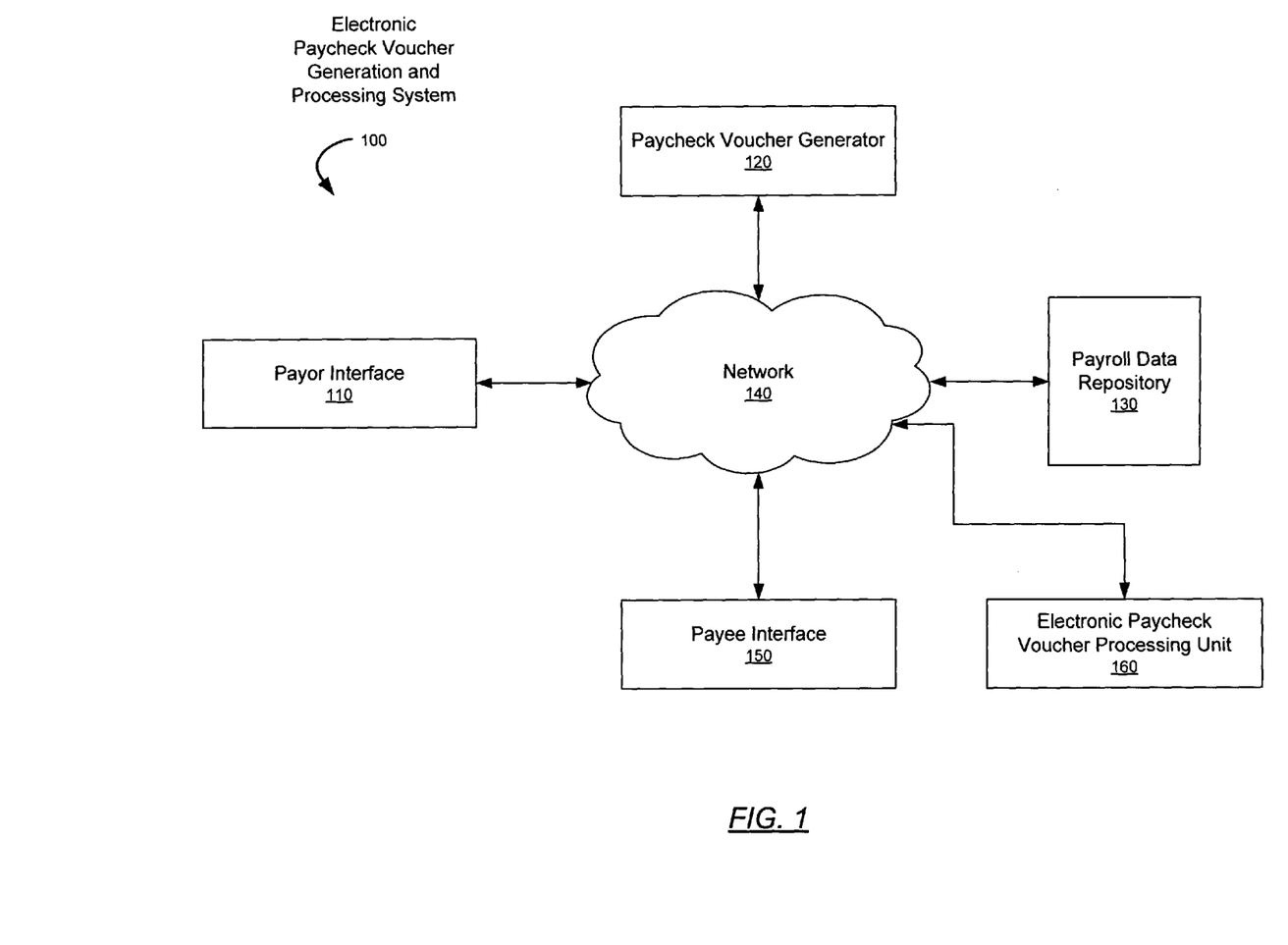
FIG. 1 shows a system for generating and processing an electronic paycheck voucher in accordance with one or more embodiments of the invention.

FIG. 1 shows a system in accordance with one or more embodiments of the invention. As shown in FIG. 1, an electronic paycheck voucher generation and processing system (100) has multiple components including a paycheck voucher generator (120), a payroll data repository (130), an electronic paycheck voucher processing unit (160), and one or more interfaces, such as a payor interface (110) and a payee interface (150). Each of these components are described below and may be located on the same device (e.g., a server, mainframe, desktop PC, laptop, PDA, telephone, mobile phone, kiosk, and/or other electronic devices) or may be located on separate devices connected by a network (e.g., network (140)). The network (140) may be a local area network (LAN) or a wide area network (WAN) (e.g., the Internet) with wired and/or wireless segments. The system shown in FIG. 1 and described herein may be a component and/or module in an employee-based payroll system as described in the patent application owned by the same assignee and filed concurrently with this application, namely patent application Ser. No. 11/592,794 filed on Nov. 3, 2006 entitled "EMPLOYEE-BASED PAYROLL" with the inventors Paul Rosenfeld, Terry Hicks, Roy Goldman, and Kevin Reeth, which is hereby incorporated by reference herein.

In one or more embodiments of the invention, a payroll data repository (130) stores payroll data associated with one or more payees (e.g., employees). In addition to information about the payor (e.g., number of employees, type of business, physical address, benefits offered), payroll data stored for use by the payor (e.g., employers) may include payroll information about a payee (e.g., annual salary, pre-tax deductions, retirement savings deductions, state and federal taxes, net salary, and/or other payroll items). Payroll data may also include information regarding one-time payments (e.g., bonus pay), recurring payments (e.g., periodic net pay), payroll history and payroll policies (e.g., payroll dates, late payroll procedures, and/or other policies). In one or more embodiments of the invention, net pay (payable in periodic installments or as a lump sum amount) corresponds to annual salary of a payee minus taxes and deductions for benefits chosen by the payee.

In one or more embodiments of the invention, the payroll data repository (130) stores payee profiles (not shown). A payee profile may include both personal information associated with a payee (e.g., payee name, payee address, payee social security number, and/or other information) and a distribution preference defined by the payee. In one or more embodiments of the invention, a distribution preference provides rules for partitioning a received net payment into multiple values (not to exceed the total amount of the net payment) and a payment destination (e.g., a gift card account, a credit card account, a bank account, a trust account, a retirement savings account, an education savings account, an account of a person other than the payee, a hard copy check, a smart card device, and/or other destinations) for each of the multiple values (discussed below). In one or more embodiments of the invention, multiple distribution preferences, each providing different rules for partitioning a received net payment, may be defined by a payee and stored in the payee profile.

In one or more embodiments of the invention, access to the payroll data repository (130) is restricted. Access to the payroll data repository (130) may require authentication using passwords, secret questions, personal identification numbers (PINs), and/or biometrics. In one or more embodiments of the invention, the payroll data repository (130) is implemented using a database, a hierarchical (flat) file, or any other type of data store.

In one or more embodiments of the invention, a paycheck voucher generator (120) is configured to generate electronic paycheck vouchers payable to one or more payees. An electronic paycheck voucher is an acknowledgment that funds in the amount of a net payment is payable to a payee. The electronic paycheck voucher may also include other information, for example, a payee's name, a payment date, and information associated with the payor (e.g., payor name, payor address, and/or other information). Further, in one or more embodiments of the invention, the electronic paycheck voucher is an electronic acknowledgment provided in a secure, verifiable manner where the authenticity and veracity of the voucher may be determined. For example, the electronic paycheck voucher may be in the form of an embedded image in an e-mail message, a webpage, a link to an electronic image, and/or other communication media.

The paycheck voucher generator (120) may also be configured to notify a payee (e.g., via email, a pre-recorded telephone message, a fax transmission, and/or other notification method) following the generation of an electronic paycheck voucher payable to the payee. In one or more embodiments of the invention, the paycheck generator (120) may also store the generated electronic paycheck voucher in a repository (e.g., payroll data repository (130)) for the payee to access.

In one or more embodiments of the invention, the paycheck voucher generator (120) operates automatically based on existing payroll information (e.g., payroll information stored in the payroll data repository (130)). In one or more embodiments of the invention, the paycheck voucher generator (120) requires authorization from a payor prior to generating an electronic paycheck voucher. The paycheck voucher generator (120) may also maintain records of all generated electronic paycheck vouchers for a period of time, as required by the business, governmental entities, or personal preference.

In one or more embodiments of the invention, a payor interface (110) provides a payor access to the payroll data repository (130) and/or a paycheck voucher generator (120) using know networking and transmission techniques and protocols. The payor interface (110) may also provide an interface for operatively connecting the payroll data repository (130) and the paycheck voucher generator (120) also using known techniques. In one or more embodiments of the invention, a payor accesses the payroll data repository (130) using the payor interface (110) to view/modify payroll information associated with one or more payees (e.g., annual salary, payroll dates, non-taxable deductions, net salary, and/or other payroll information). A payor may access the paycheck voucher generator (120) using the payor interface (110) to authorize the generation of electronic paycheck vouchers and/or view the records maintained by the paycheck voucher generator (120). In one or more embodiments of the invention, the payor interface (110) is implemented as a graphical user interface (GUI).

In one or more embodiments of the invention, an electronic paycheck voucher processing unit (160) is configured to process an electronic paycheck voucher based on a distribution preference. As discussed above, a distribution preference may be associated with a payee profile and provides rules for partitioning a received electronic paycheck voucher into multiple values and a payment destination (e.g., a gift card account, a credit card account, a bank account, a trust account, a retirement savings account, an education savings account, an account of a person other than the payee, a hard copy check, a smart card device, and/or other destination) for each of the multiple values. Accordingly, in one or more embodiments of the invention, the electronic paycheck voucher processing unit (160) is configured to access both the payroll data repository (130) and the specified payment destinations to process an electronic paycheck voucher.

In one or more embodiments of the invention, a payee interface (150) provides a payee access to the payroll data repository (130). A payee may use the payee interface (150) to create or access/modify one or more payee profiles. A payee may also use the payee interface (150) to access a generated electronic paycheck voucher and/or to authorize processing of the generated electronic paycheck voucher (e.g., via the electronic paycheck voucher processing unit (160)) based on distribution preference. In one or more embodiments of the invention, the payee interface (150) is a graphical user interface (GUI).

While the invention described above requires an interface to communicate between the various component, one skilled in the art will appreciate that direct communication between coupled components in the electronic paycheck voucher generation and processing system (100) is possible. Further, additional interfaces between components may be possible to allow the generation and processing of electronic paycheck vouchers.

Because payroll data is sensitive information, each of the interfaces described above may be configured to be a secure interface with various methods or combination of methods of authentication, verification, encryption, security protocols in an effort to secure the information from theft or other potential misuse.

Figure 2:
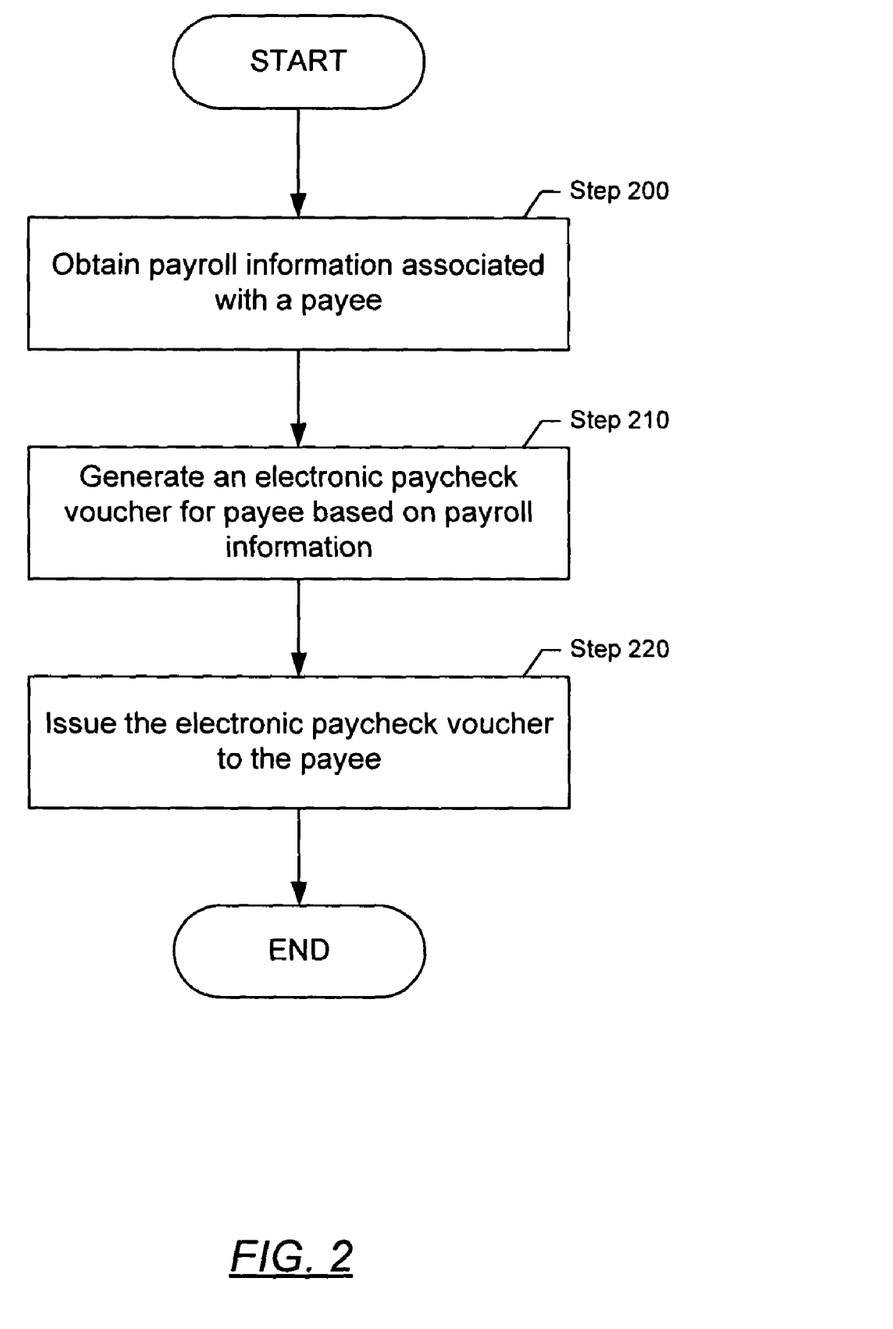
FIGS. 2 and 3 show flowcharts describing the method for generating and processing an electronic paycheck voucher in accordance with one or more embodiments of the invention.

FIG. 2 shows a flowchart in accordance with one or more embodiments of the invention. The process shown in FIG. 2 may be used by a payor to generate an electronic paycheck voucher for a payee. Initially, payroll information associated with a payee is obtained (STEP 200). As discussed above, payroll information may include, for example, a net pay of the payee and a payroll date associated with the payee. The payroll information may be obtained by accessing the payroll information from a data repository associated with a payroll system (such as those described above), entering the information by the payee or payor manually, compiling the information using public records, importing the information from a compatible payroll system, and/or other access methods.

In STEP 210, an electronic paycheck voucher based on the payroll information is generated for the payee. The electronic paycheck voucher may be automatically generated based on the payroll information or may require approval from the payor. Generation of the voucher may be performed using a secure computer system that is configured to take the confidential payroll information and process the information to obtain a voucher in a form that may then be transmitted to a payee. For example, a payroll system may process all employees of a company and create digital images of a voucher for each employee. This digital voucher may include the name of the employee as well as other information to allow the veracity or authentication of the voucher to be verified. In one or more embodiments of the invention, a user interface may be used to seek the approval of the payee prior to the generation of the voucher.

In STEP 220, the generated electronic paycheck voucher is issued to the payee. Issuing the electronic paycheck voucher to a payee may include notifying the payee (e.g., via an email, a pre-recorded telephone message, a fax transmission, and/or other notification methods) that the electronic paycheck voucher has been generated. In one or more embodiments of the invention, issuing the electronic paycheck voucher includes storing the electronic paycheck voucher (e.g., in Payroll Data Repository (130)) for the payee to access.

Figure 3:
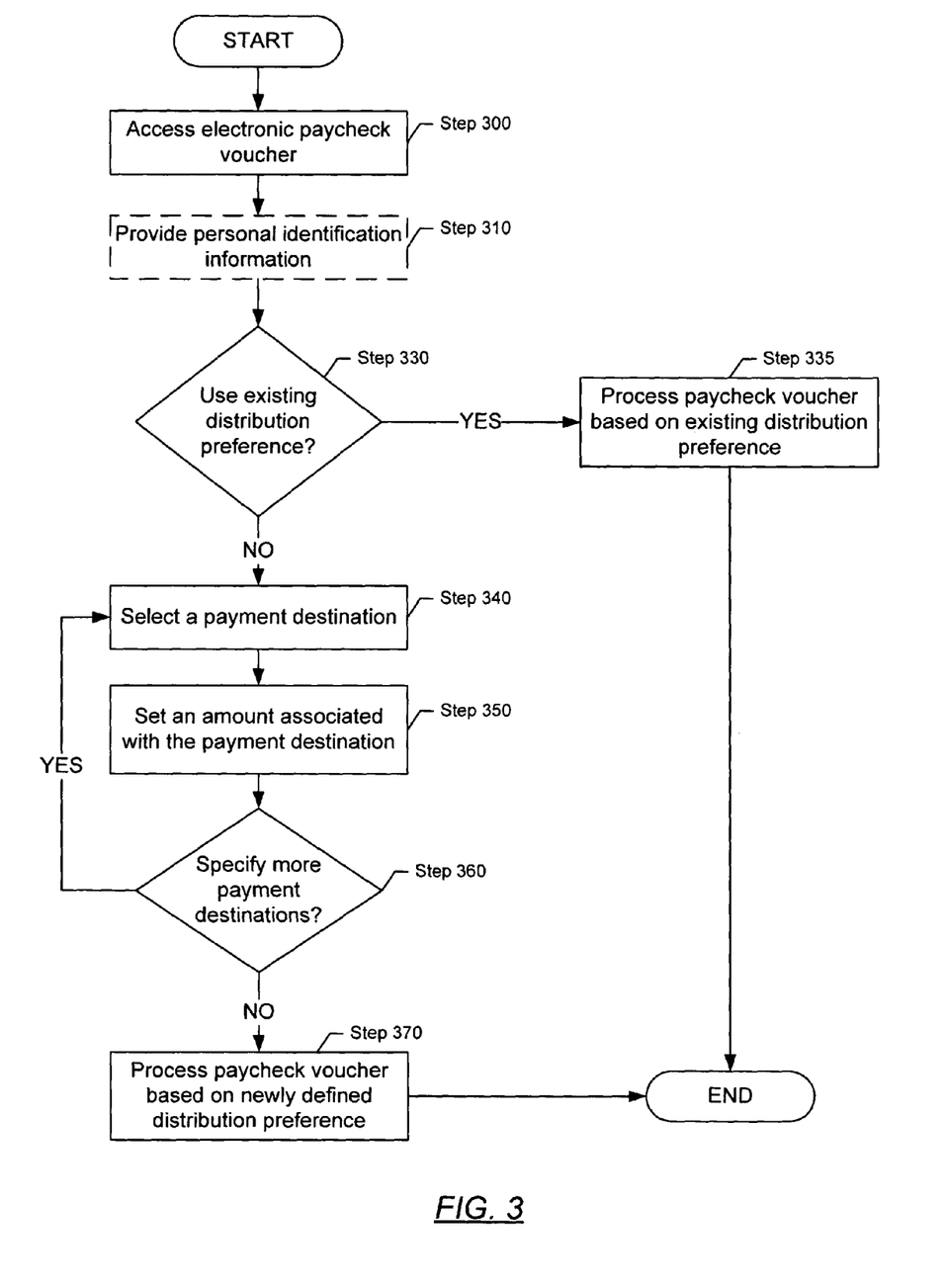

FIG. 3 shows a flowchart in accordance with one or more embodiments of the invention. The process shown in FIG. 3 may be used by a payee to access and process an electronic paycheck voucher. In STEP 300, the electronic paycheck voucher is accessed by the payee. In one or more embodiments of the invention, the electronic paycheck voucher is accessed by executing a software program resident on a computer associated with the payee. In one or more embodiments of the invention, the electronic paycheck voucher is accessed through an internet website (e.g., via a web browser). The link for the internet website may be provided to the payee via a notification message (discussed above). The electronic paycheck voucher may be displayed in a paper paycheck voucher format for the payee to examine and verify.

In one or more embodiments of the invention, access to the electronic paycheck voucher may be restricted. Accordingly, a payee may need to be authenticated (e.g., using a password, secret question, Personal Identification Number (PIN), biometrics, or other authentication method) prior to accessing the electronic paycheck voucher. When the payee is accessing the electronic paycheck voucher for the first time and/or when the payee has not yet established a payee profile, the payee may use a temporary password to access the electronic paycheck voucher.

In STEP 310, personal identification information is provided by the payee. In one or more embodiments of the invention, STEP 310 is optional and may only be required when the payee has not yet established a payee profile. Personal identification information may include the payee's name, the payee's address, the payee's social security number, and/or other information. In one or more embodiments of the invention, providing personal information may also include establishing authentication credentials (e.g., passwords, PINs, biometric samples, and/or other credentials) associated with the payee for future access to an electronic paycheck voucher. The information captured during STEP 310 may be used to initialize a payee profile.

In STEP 330, a determination is made whether the payee has already defined a distribution preference. As discussed above, a distribution preference may be associated with a payee profile and provides rules for partitioning a received net payment (e.g., an electronic paycheck voucher) into multiple values and a payment destination (e.g., a gift card account, a credit card account, a bank account, a trust account, a retirement savings account, an education savings account, an account of a person other than the payee, a hard copy check, a smart card device, and/or other destinations) for each of the multiple values. When a payee already has defined a distribution preference, the process proceeds to STEP 335. When the payee has not defined a distribution preference, or when the payee does not wish to use the existing definition of the distribution preference, the process proceeds to STEP 340.

In STEP 340, a payment destination is selected by the payee. As discussed above, a payment destination may include gift card accounts, credit card accounts, bank accounts, trust accounts, retirement savings accounts, education savings accounts, accounts of a persons other than the payee, hard copy checks smart card devices, and/or other destinations. In one or more embodiments of the invention, when a payee wishes to provide a new payment destination (e.g., a new savings account) instead of selecting an existing payment destination, information regarding the new a payment destination (e.g., account number, transit number, routing number, bank name, and/or other information) may need to be captured.

In STEP 350, the payee specifies a percentage (e.g., 10%, 23%, 90%, etc.) of the amount of the electronic paycheck voucher to be allocated with the selected payment destination (STEP 340). In one or more embodiments of the invention, a fixed value (e.g., $100, $350, $10,000, etc.) may be used instead of a percentage. The payee may be prevented from selecting a percentage or fixed value that exceeds the net pay amount of the electronic paycheck voucher.

In STEP 360, the payee is given the option of selecting additional payment destinations. Should the payee wish to select an additional payment destination, the process returns to STEP 340. Should the payee be finished with selecting payment destinations, the process proceeds to STEP 370. In one or more embodiments of the invention, by executing STEP 340, STEP 350, and STEP 360, the payee is defining a distribution preference. The payee may choose to save this distribution preference (e.g., as part of the payee profile) for future electronic paycheck vouchers.

In STEP 370, the electronic paycheck voucher is processed based on the recently defined distribution preference (STEPS 340, 350, and 360). As discussed above, processing the electronic paycheck voucher includes partitioning the electronic paycheck voucher into the specified values, and sending each value to its corresponding payment destination. In one or more embodiments of the invention, when the payment destination is an account at a financial institution, the appropriate value associated with the account may be sent via an electronic fund transaction. Electronic fund transaction may correspond to a transfer of funds electronically between two financial accounts. In one or more embodiments of the invention, when the payment destination is a smart card device, the appropriate value associated with the smart card may be sent to a smartcard processor.

In one or more embodiments of the invention, when the payment destination is a hard copy check, the hard copy check may be printed by the payee, or may be printed and mailed to the payee (or a person authorized by the payee). A hard copy check may include components to render the hard copy check electronically identifiable (e.g., a barcode, an embedded tag, and/or other identifiable indicator) by an entity that cashes the hard copy check. Further, the hard copy check is designed for onetime use.

In one or more embodiments of the invention, STEP 335 is essentially the same as STEP 370, except the electronic paycheck voucher is processed based on one of the existing definitions of a distribution preference in the payee profile.

In one or more embodiments of the invention, once distributed, a rechargeable form of payment (e.g., a gift card, smartcard, or other programmable medium for making payment) is recharged during the next payroll cycle or whenever the user may choose to load the rechargeable form of payment with additional funds. Further, in one or more embodiments of the invention, the funds from the rechargeable form of payment are accessible via any financial institution and may reload through a financial institution. For example, the rechargeable card may be reloaded or accessed through a traditional Automated Teller Machine (ATM).

Figure 4:
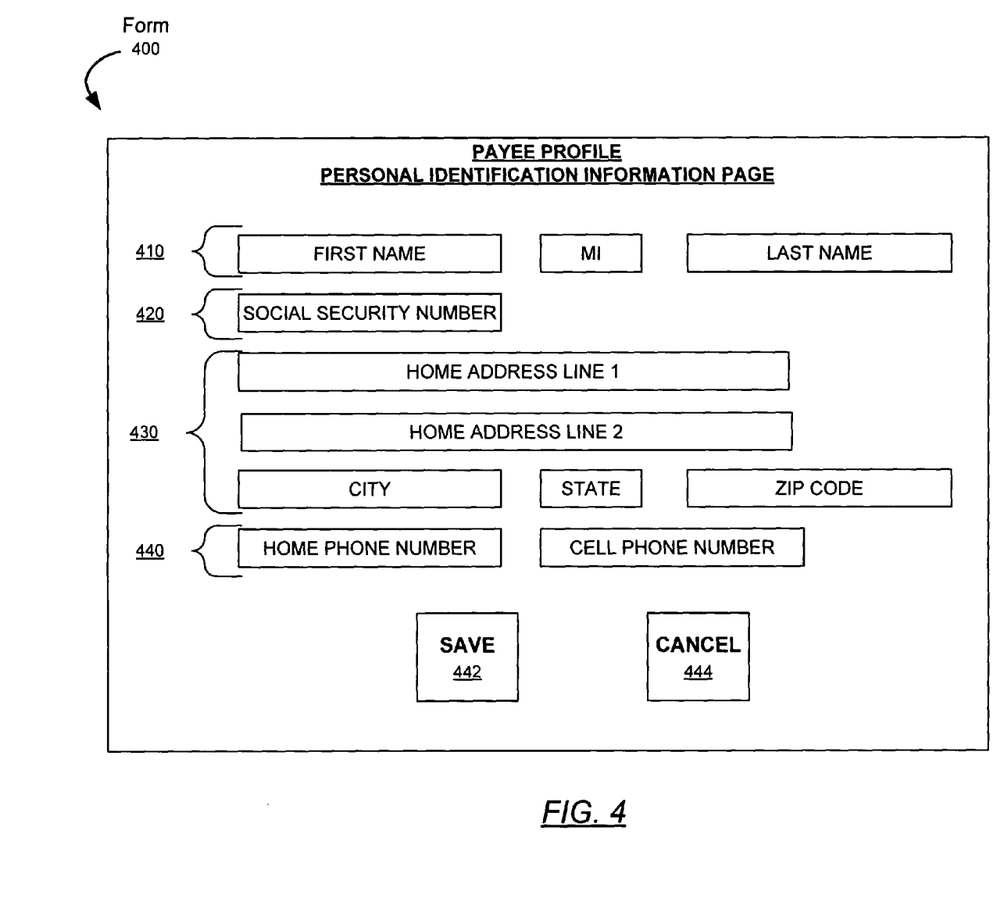
FIGS. 4-7 show example screen shots in accordance with one or more embodiments of the invention.

FIG. 4 shows an example screenshot of a graphical user interface in accordance with one or more embodiments of the invention. The example in FIG. 4 is a form (Form (400)) used to capture personal identification information associated with a payee. As shown in FIG. 4, Form (400) may include one or more fields to capture a payee's name (410), a field to capture a payee's social security number (420), one or more fields to capture a payee's address (430), and multiple fields to capture a payee's telephone number(s) (440). In one or more embodiments, Form (400) may also include multiple fields to capture authentication credentials (e.g., passwords, PINs, biometric samples, and/or other credentials) (not shown) associated with the payee. Form (400) may also include action buttons ((Save (442), Cancel (444)) to update a payee profile with the contents of Form (400) and/or discard the contents of Form (400). In one or more embodiments, Form (400) is used to enroll the payee (e.g., an employee) into a payroll and/or benefits system for an employer.

Figure 5:
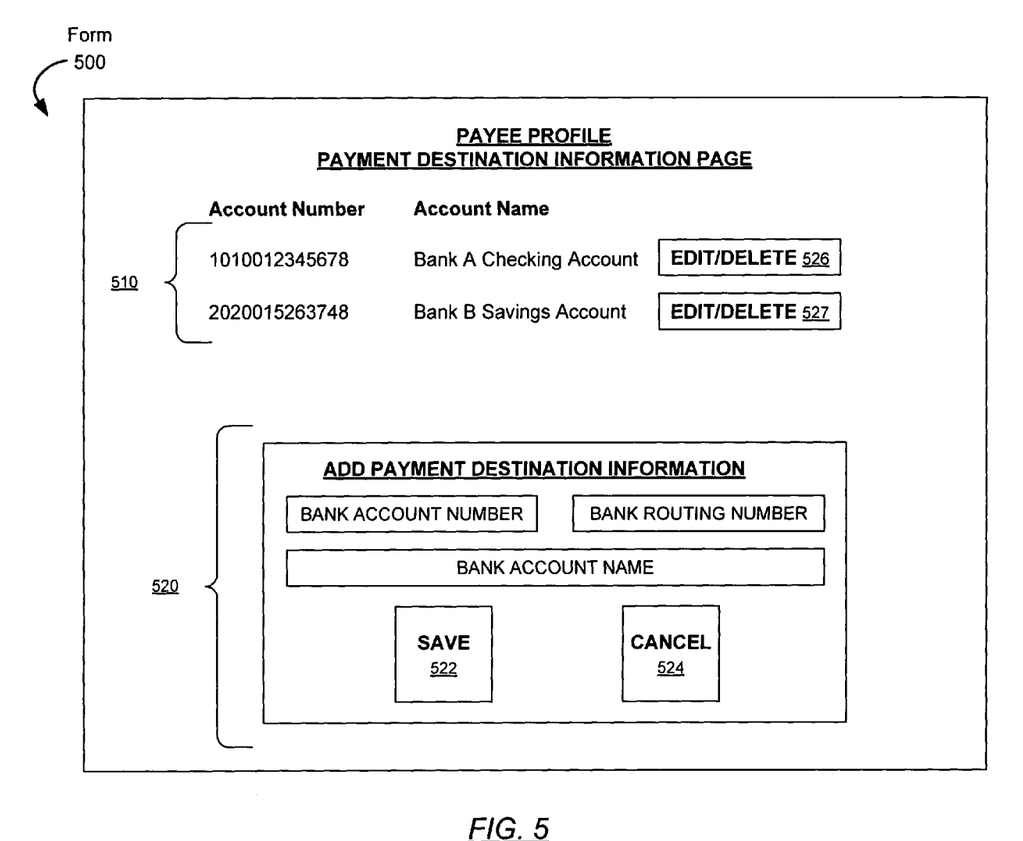

FIG. 5 shows an example screenshot of a graphical user interface in accordance with one or more embodiments of the invention. As shown in FIG. 5, the example screenshot displays existing payment destinations (510), should such payment destinations exist. In this example, the payee entered two payment destinations (510) (i.e., Bank A checking account and Bank B savings account) associated with the payee profile. These two payment destinations are capable of being selected by a payee when defining a distribution preference. The existing payment destinations (510) may be modified and/or deleted using an associated action button (Edit/Delete (526), Edit/Delete (527)). One skilled in the art would appreciate that while this example shows two payment destinations, only one destination may be entered or several destinations may be entered.

As shown in FIG. 5, the example screenshot of a graphical user interface also displays a window (520) on Form (500) for adding additional payment destinations. Window (520) may include multiple fields to capture account information (e.g., bank account number, bank routing number, and bank account name). Window (520) may also include action buttons (e.g., Save (522), Cancel (524)) to update or discard the existing payment destinations based on the contents of window (520). One skilled in the art would appreciate that while this example shows payment destinations as only bank accounts, the payment destination could also be electronic medium, rechargeable cards, hard copy checks, or other negotiable instruments.

Figure 6:
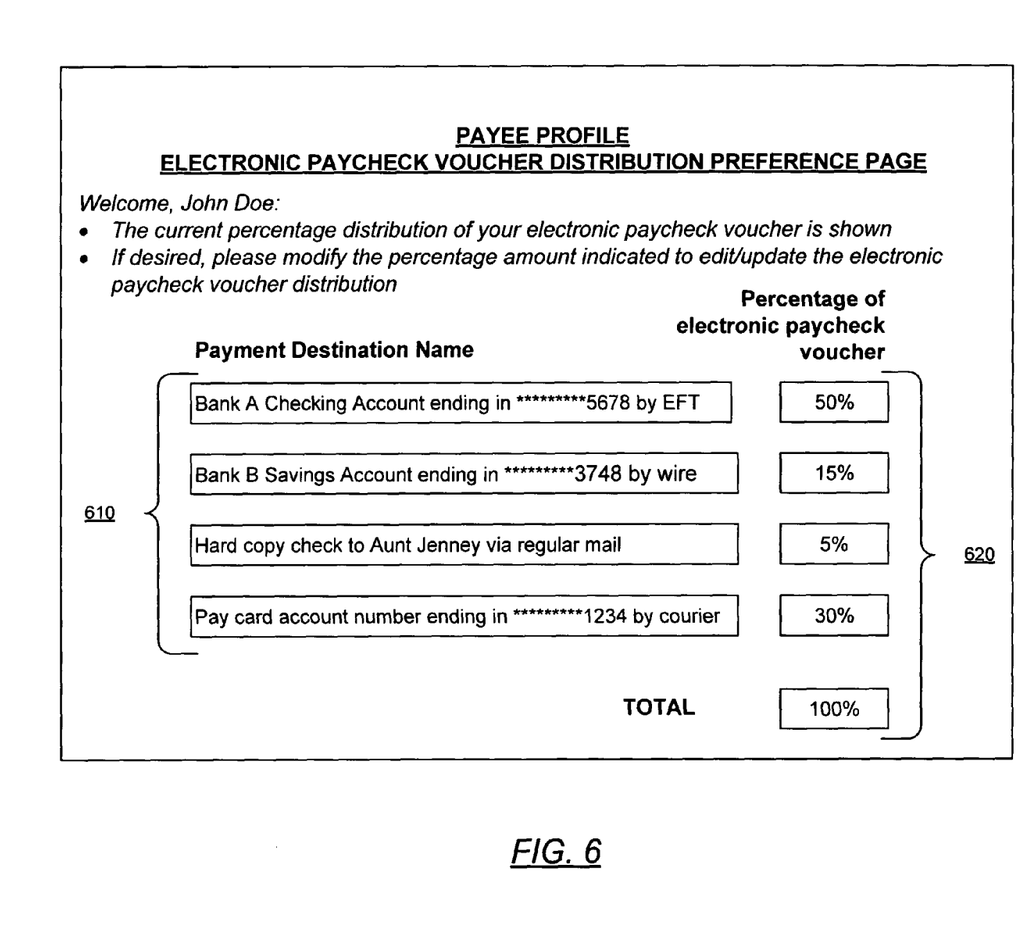

FIG. 6 shows an example screenshot of a graphical user interface in accordance with one or more embodiments of the invention. Specifically, FIG. 6 shows a distribution preference associated with a payee profile. As shown in FIG. 6, the payee may select multiple payment destinations (610) for a given electronic paycheck voucher. In addition, the payee may specify a corresponding value (620) for each of the payment destinations (610). The value indicates the percent amount of the electronic check to be allocated to the payment destination. Accordingly, the sum of the values is 100%. The distribution preference may be changed by modifying the values and/or adding additional payment destinations and their corresponding values. As shown, multiple payment destinations may be used and each of the payment destinations may be assigned different percentages. Further, the method of delivery may be designated, such as electronic fund transfer (EFT), courier, wire transfer, regular mail, or other forms of delivery.

Figure 7:
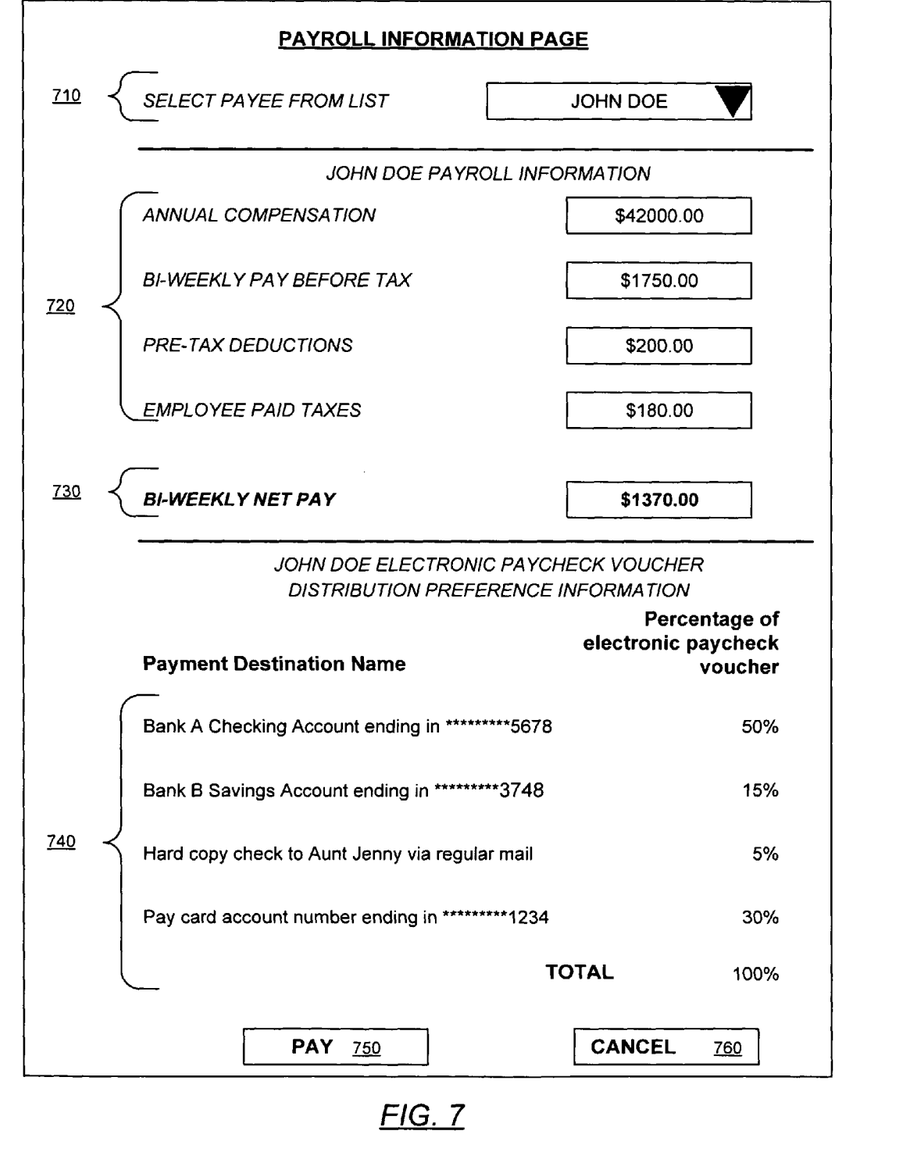

FIG. 7 shows an example screenshot of a graphical user interface in accordance with one or more embodiments of the invention. Specifically, FIG. 7 shows payroll information associated with a payee, which is viewable by a payor to make payment. As shown in the figure, the payor may select a payee from a list of payees (710) to view payroll information of the payee. Upon selecting the payee (710), a detailed breakdown of payroll information (720) for the selected payee is provided. The detailed breakdown may include, for example, annual compensation, bi-weekly pay before tax, pre-tax deductions, and employee paid taxes (720). Based on this information, the bi-weekly net pay (730) is calculated and displayed. Additionally, distribution preference of the payee is viewable (740) through the payroll information page in accordance with one or more embodiments of the invention. Finally, action buttons, such as pay (750) and cancel (760), may be used to process net pay for the selected payee and cancel/discard any un-processed changes respectively. One skilled in the art would appreciate that a similar graphical user interface may be used to display the payroll information to the payee and allow for modifications of the information prior to distribution of the payroll. In one or more embodiments, the payee may be linked to an interface similar to FIG. 7 in the notification message received. Such an interface may also be forwarded to the payee as a proof of distribution of the paycheck voucher following disbursement; however, none of the fields would be editable.

In a small business environment, every day between two adjacent periodic payroll dates may be important to collect enough receivables to make payroll. Paying employees (i.e., payees) through direct deposit (i.e., electronic funds transaction) in this situation may be unattractive because small business owners (i.e., payors) calculate paychecks and initiate direct deposit two days in advance of payday. In such a situation, the small business owners may want to pay employees through an electronic paycheck voucher, thereby giving small business owners more time to collect enough receivables and still provide employees with the benefits of direct deposit.

Figure 8:
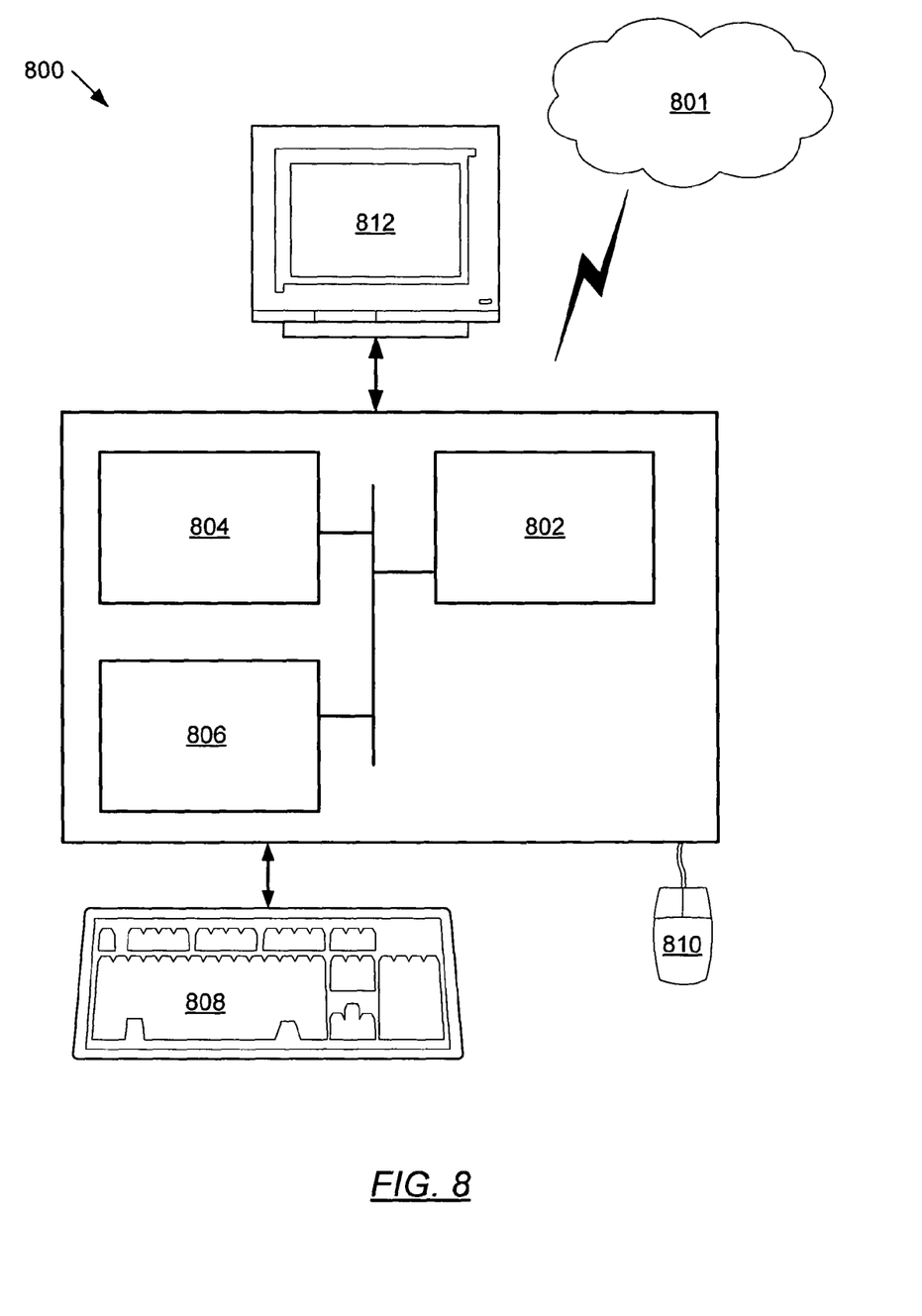
FIG. 8 shows a computer system connected to a network in accordance with one or more embodiments of the invention.

The invention may be implemented on virtually any type of computer regardless of the platform being used. For example, as shown in FIG. 8, a computer system (800) includes a processor (802), associated memory (804), a storage device (806), and numerous other elements and functionalities typical of today's computers (not shown). The computer (800) may also include input means, such as a keyboard (808) and a mouse (810), and output means, such as a monitor (812). The computer system (800) is connected to a network (801) (e.g., a Local Area Network (LAN), a Wide Area Network (WAN), and/or other network topologies) via a network interface connection (not shown). Those skilled in the art will appreciate that these input and output means may take other forms.

Further, those skilled in the art will appreciate that one or more elements of the aforementioned computer system (800) may be located at a remote location and connected to the other elements over a network. Further, the invention may be implemented on a distributed system having a plurality of nodes, where each portion of the invention (e.g., payor interface, payee interface, paycheck voucher generator, payroll data repository, and/or other components) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of distributing pay comprising:
    obtaining payroll information including an updatable distribution preference specifying a first payment destination, a second payment destination, a first distribution value, and a second distribution value;
    generating an electronic paycheck voucher according to the updatable distribution preference of a payroll system, executing on a processor, wherein the electronic paycheck voucher is associated with a net pay of a payee;
    issuing the electronic paycheck voucher to the payee;
    receiving a change to the updatable distribution preference from the payee after issuing the electronic paycheck voucher;
    modifying the updatable distribution preference based on the change prior to partitioning the electronic paycheck voucher;
    receiving a confirmation of the updatable distribution preference from the payee after issuing the electronic paycheck voucher;
    partitioning the electronic paycheck voucher into the first distribution value and the second distribution value after receiving the confirmation; and
    sending the first distribution value to the first payment destination and the second distribution value to the second payment destination.

2. The method of claim 1, wherein the first payment destination is an account of the payee, and sending the first distribution value comprises executing an electronic fund transaction for at least a portion of the net pay into the account of the payee.

3. The method of claim 1, wherein the first payment destination is a hard copy check, and sending the first distribution value comprises generating the hard copy check.

4. The method of claim 3, wherein the hard copy check is electronically identifiable.

5. The method of claim 3, wherein the hard copy is configured for a one time use.

6. The method of claim 1, wherein the first payment destination is at least one selected from a group consisting of a gift card account, a credit card account, a bank account, a trust account, a retirement savings account, an education savings account, an account of a person other than the payee, and a smart card device.

7. A method of processing a payment, comprising:
    accessing an electronic paycheck voucher by a payee, wherein the electronic paycheck voucher is associated with a net pay of the payee and generated according to a first updatable distribution preference of a payroll system;
    selecting, after accessing the electronic paycheck voucher, a second updatable distribution preference of the payroll system specifying a first payment destination, a second payment destination, a first distribution value, and a second distribution value, wherein the second updatable distribution preference is selected by the payee;
    sending the second updatable distribution preference, wherein the electronic paycheck voucher is regenerated according to the second updatable distribution preference;
    partitioning, using a processor, the electronic paycheck voucher into the first distribution value and the second distribution value after sending the second updatable distribution preference; and
    sending the first distribution value to the first payment destination and the second distribution value to the second payment destination.

8. The method of claim 7, wherein the first updatable distribution preference is associated with a profile of the payee.

9. The method of claim 7, wherein accessing the electronic paycheck voucher comprises using at least one selected from a group consisting of electronic mail, a web-based interface, and a software interface by the payee.

10. The method of claim 7, wherein accessing the electronic paycheck voucher comprises providing authentication associated with the payee.

11. The method of claim 7, wherein the first payment destination is at least one selected from a group consisting of a gift card account, a credit card account, a bank account, a trust account, a retirement savings account, an education savings account, an account of a person other than the payee, and a smart card device.

12. The method of claim 7, wherein the first payment destination is an account of the payee, and sending the first distribution value comprises executing an electronic fund transaction for at least a portion of the net pay into the account of the payee.

13. The method of claim 7, wherein the first payment destination is a hard copy check, and sending the first distribution value comprises generating the hard copy check.

14. A system for processing a payment comprising:
 a paycheck voucher generator configured to:
  generate an electronic paycheck voucher according to an updatable distribution preference of a payroll system specifying a first payment destination, a second payment destination, a first distribution value, and a second distribution value, and
  issue the electronic paycheck voucher to a payee,
  wherein the electronic paycheck voucher is associated with a net pay of the payee
 a payee interface configured to:
  access the electronic paycheck voucher and send a confirmation after the electronic paycheck voucher is issued, and
  send a change to the updatable distribution preference from the payee after the electronic paycheck voucher is sent; and
 an electronic paycheck voucher processing unit configured to:
  partition the electronic paycheck voucher into the first distribution value and the second distribution value after the confirmation is sent, and
  send the first distribution value to the first payment destination and the second distribution value to the second payment destination.

15. The system of claim 14, further comprising:
 a payor interface and a payroll data repository operatively connected to the paycheck voucher generator.

16. The system of claim 14, wherein the updatable distribution preference is associated with a payee profile.

17. The system of claim 16, wherein the payee profile comprises the first payment destination associated with the payee.

18. The system of claim 14, wherein the first payment destination is at least one selected from a group consisting of a gift card account, a credit card account, a bank account, a trust account, a retirement savings account, an education savings account, an account of a person other than the payee, a hard copy check, and a smart card device.

19. A computer readable medium storing instructions executable on a processor for processing a payment, the executable instructions comprising functionality to:
 obtain payroll information including an updatable distribution preference specifying a first payment destination, a second payment destination, a first distribution value, and a second distribution value;
 generate an electronic paycheck voucher according to the updatable distribution preference of a payroll system, wherein the electronic paycheck voucher is associated with a net pay of a payee;
 issue the electronic paycheck voucher to the payee;
 receive a change to the updatable distribution preference from the payee after issuing the electronic paycheck voucher;
 modify the updatable distribution preference based on the change prior to partitioning the electronic paycheck voucher;
 receive a confirmation of the updatable distribution preference from the payee after issuing the electronic paycheck voucher;
 partition the electronic paycheck voucher after receiving the confirmation into the first distribution value and the second distribution value; and
 send the first distribution value to the first payment destination and the second distribution value to the second payment destination.

20. The computer readable medium of claim 19, wherein the first payment destination is an account of the payee, and the instructions to send the first distribution value comprise functionality to execute an electronic fund transaction for at least a portion of the net pay into the account of the payee.

21. The computer readable medium of claim 19, wherein the first payment destination is a hard copy check, and instructions to send the first distribution value comprise functionality to generate the hard copy check.

22. The computer readable medium of claim 21, wherein the hard copy check is electronically identifiable.

23. The computer readable medium of claim 21, wherein the hard copy check is configured for a one time use.

24. The computer readable medium of claim 19, wherein the first payment destination is at least one selected from a group consisting of a gift card account, a credit card account, a bank account, a trust account, a retirement savings account, an education savings account, an account of a person other than the payee, a hard copy check and a smart card device.

25. A computer readable medium storing instructions executable on a processor for processing a payment, the executable instructions comprising functionality to:
 access an electronic paycheck voucher, wherein the electronic paycheck voucher is generated according to a first updatable distribution preference of a payroll system;
 select, after accessing the electronic paycheck voucher, a second updatable distribution preference of the payroll system specifying a first payment destination, a second payment destination, a first distribution value, and a second distribution value, wherein the second updatable distribution preference is selected by the payee;
 send the second updatable distribution preference after the electronic paycheck voucher is accessed, wherein the electronic paycheck voucher is regenerated according to the second updatable distribution preference after the second updatable distribution preference is sent;
 partition the electronic paycheck voucher into the first distribution value and the second distribution value after the second updatable distribution preference is sent; and
 send the first distribution value to the first payment destination and the second distribution value to the second payment destination.

26. The computer readable medium of claim 25, wherein the first payment destination is at least one selected from a group consisting of a gift card account, a credit card account, a bank account, a trust account, a retirement savings account, an education savings account, an account of a person other than the payee, a hard copy check and a smart card device.

27. The method of claim 1, wherein at least one selected from a group consisting of the first distribution value, the first payment destination, the second distribution value, and the second payment destination is specified by the change.

28. The system of claim 14, wherein at least one selected from a group consisting of the first distribution value, the second distribution value, the first payment destination, and the second payment destination is specified by the change.

29. The computer readable medium of claim 19, wherein at least one selected from a group consisting of the first distribution value, the second distribution value, the first payment destination, and the second payment destination is specified by the change.

* * * * *